Aug. 14, 1934.   N. B. CHAVEAS   1,970,416

SLICING MACHINE

Filed Feb. 24, 1931   3 Sheets-Sheet 1

INVENTOR
Nicholas B. Chaveas.

By
ATTORNEY

Aug. 14, 1934.   N. B. CHAVEAS   1,970,416
SLICING MACHINE
Filed Feb. 24, 1931   3 Sheets-Sheet 2
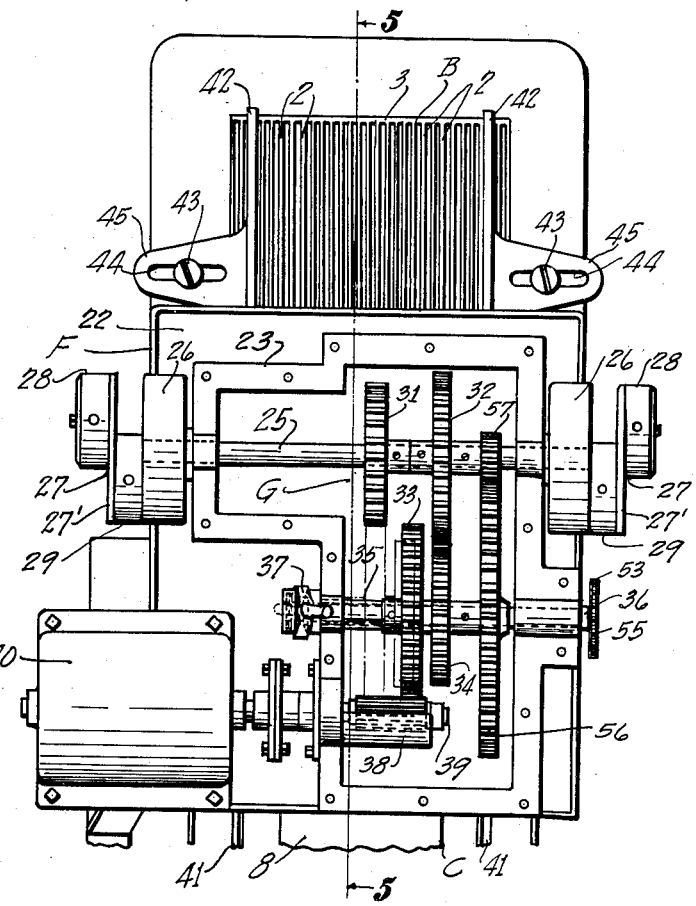
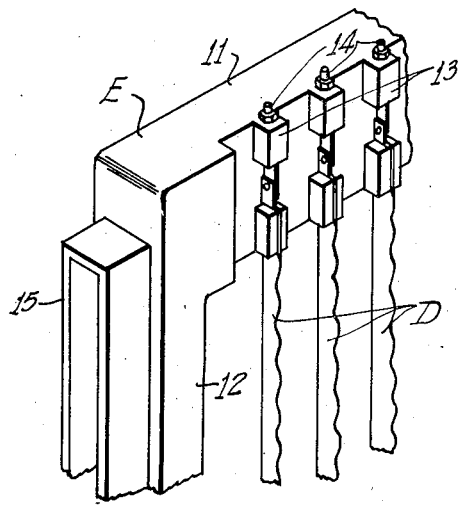
INVENTOR
Nicholas B. Chaveas.
BY
ATTORNEY Aug. 14, 1934.  N. B. CHAVEAS  1,970,416
SLICING MACHINE
Filed Feb. 24, 1931   3 Sheets-Sheet 3

*Fig. 5.*

INVENTOR
*Nicholas B. Chaveas.*
BY
ATTORNEY

Patented Aug. 14, 1934

1,970,416

UNITED STATES PATENT OFFICE 1,970,416

SLICING MACHINE

Nicholas B. Chaveas, Evanston, Ill., assignor to Papendick, Inc., St. Louis, Mo., a corporation of Missouri Application February 24, 1931, Serial No. 517,887

3 Claims. (Cl. 146—153)

This invention relates generally to slicing machines. More particularly, my invention relates to a certain new and useful improvement in machines especially adapted for the slicing of baked loaves of bread and the like, and has for its objects the provision of a substantially automatic machine for effecting with speed, convenience, economy, and efficiency the division into uniform slices of successively fed baked loaves and the simplification and improvement generally of machines of the class mentioned.

And with the above and other objects in view, my invention resides in the novel features of form, construction, arrangement, and combination of parts hereinafter described and pointed out in the claims.

In the accompanying drawings,—

Figure 3 is an enlarged plan view of the machine, the upper housing-section of some of the operating or moving parts of the machine being removed;

Figure 4 is an enlarged fragmental perspective view of one of the knife-frames; and Figure 5 is a fragmental longitudinal vertical sectional view of the machine, taken approximately on the line 5—5, Figure 3.

Figure 1:
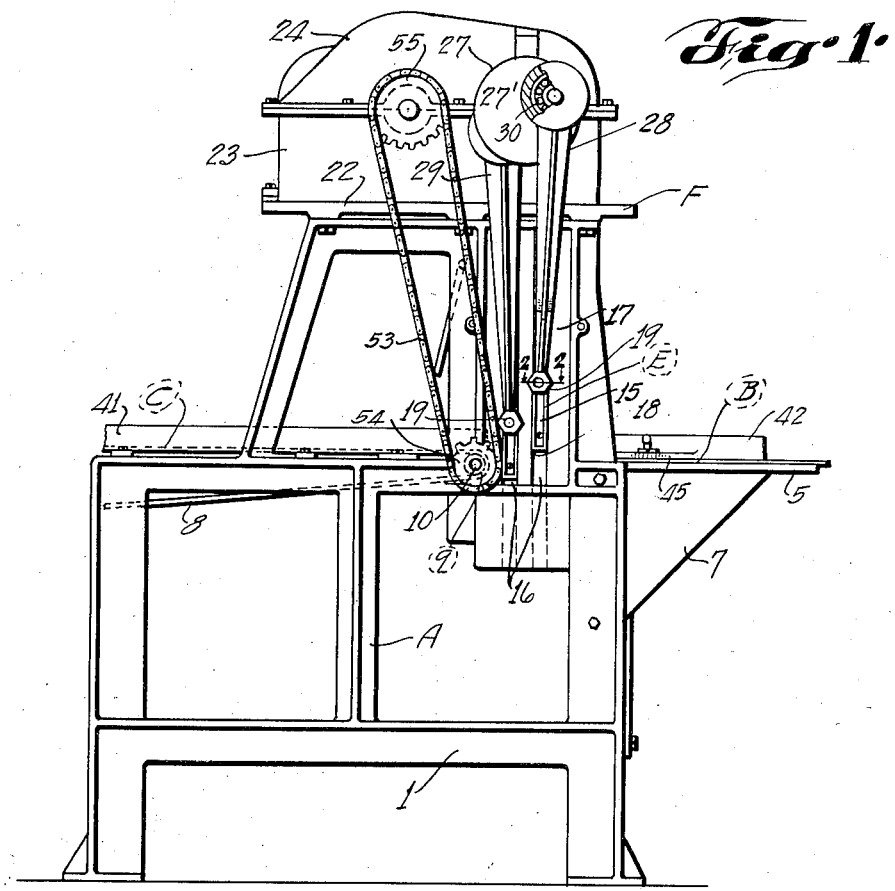
Figure 1 is a side elevational view, with the conveyer partly broken away, of a slicing machine embodying my invention.

Referring now more in detail and by reference characters to the drawings, which illustrate a preferred embodiment of my invention, A designates the main frame of the machine which preferably comprises a suitably spaced and rigidly tied together pair of substantially rectangular upstanding approximately parallel side-members 1 adapted to rest upon a floor or other like place, for supporting at a suitable intermediate elevation in the frame A, and transversely between the members 1, a preferably rectangular horizontal loaf-supporting feed-plate or grating B.

The feed-plate B, for reasons presently appearing, is composed of a plurality of spaced longitudinally parallel grids or narrow bars 2, best seen in Figure 3, preferably integrally transversely connected at the front end, and, if desired, in like manner at one or more intermediate points, by a header 3, the feed-plate B preferably also residing in an aperture 4 provided in a table 5 connecting the members 1 at the front of the machine, the walls of said aperture 4 being suitably recessed and hence providing a seat 6 for supporting the feed plate B with its top flush with the table 5.

Disposed in crumb-receptive position beneath the feed-plate B, and preferably integrally connected to and depending from the table 5, is a crumb-chute 7, the walls of which are preferably also integrally united with, or structurally connected to, the side frame-members 1.

The table 5 and its carried feed plate B may, if desired, be extended rearwardly the machine for loaf-receptive and feeding purposes, but in practice I prefer to provide some form of automatic loaf-feeding means, as, for example, in the embodiment shown, a traveling belt conveyer C comprising a conventional belt 8 trained over a head-pulley 9 mounted on a shaft 10 journalled suitably in and between the frame-members 1 for depositing successive loaves of bread in loaf-feeding sequence upon the feed-table B, the conveyer C being preferably driven by means of a chain or the like 53 trained over a lower gear 54 fixed on the shaft 10 and an upper gear 55 fixed on a driving-shaft 25 more fully later described. I show but a fragmentary part of the conveyer C, as its method of support and actuation will be obvious to one skilled in the art. Hence a more detailed description thereof is not deemed necessary here, and I may state that I do not wish to be limited for my present purposes to the specific form of loaf-feeding means shown.

Disposed preferably, though not necessarily, in a substantially vertical plane intermediate the frame members 1 and transversely spaced across the feed plate B, is a plurality of cutting or slicing elements or knives D arranged for slicing cooperation with a loaf of bread movingly supported, for such loaf-slicing purposes, on said feed-plate B. Preferably the bars 2 of the feed-plate B project in end-disconnected or comb-like manner each rearwardly through or between, and substantially beyond, adjacent pairs of the knives D for receiving from the rear a loaf of bread to be sliced, and affording a continuous support both to the body of the loaf during the slicing operation and to the several slices resulting therefrom as the loaf is fed or moved forwardly in the machine against the cutting action of the knives.

The knives D, all of whose cutting edges are turned rearwardly, that is, against the advancing loaf to be sliced, are preferably adapted for actuation, reciprocably, each adjacent pair in opposite directions for substantially neutralizing the slice-displacing effect of the cutting operation, and suitably for such purpose, the knives D are operatively supported in alternate pairs by means of a pair of confronting or opposed knive-carrying frames E, each preferably of substantially rectangular outline comprising top and bottom rails 11, connected by transversely spaced side rails 12, the latter being disposed one on each side of the respective banks of knives D.

One form of attaching the knives D to the frames E is illustrated in Figure 4, the frames E being provided with lugs 13 projecting from the respective rails 11 in such manner that the lugs 13 on one frame interfit the like lugs 13 on the other frame. Bolts 14, passed through the lugs 13, serve to tensionally engage the respective knives D in the frames E. Any form or construction of the knives D may be employed for my present purposes, the particular form shown being illustrative of a conventional type of knife well known to those skilled in the art.

Figure 2:
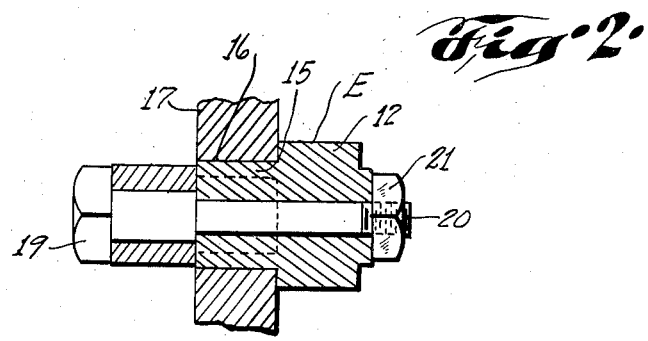
Figure 2 is an enlarged detail sectional view taken approximately on the line 2—2, Figure 1.

Projecting outwardly from each side rail 12, is an elongated shoe or slide 15, each adapted for slidable cooperation in suitably registering elongated ways 16 provided in a pair of opposing guide members 17 forming preferably a part of the respective frame members 1, each way 16 for a portion of its length having its outer wall removed, providing an elongated vertical slot 18 in which, normally, the shoe 15 is adapted to freely reciprocate. At an intermediate point, the shoe 15 is suitably bossed for abutting the shoulder of an outwardly projecting bolt or headed-pin 19 having a reduced threaded end 20 extending through the shoe 15 and then secured by a nut 21, as best seen in Figure 2, all for a purpose shortly appearing.

The guides 17 extend preferably from a point below the feed table B upstandingly therefrom, forming side walls for enclosing and most effectively safeguarding the cutting knives D, and transversely connecting the upwardly presented ends of the frame members 1, which in the present instance, as will be understood, include the guides 17, is an overhead support F comprising a top-plate 22, on which is mounted knife actuating mechanism G, which is preferably enclosed in a gear-case or housing 23 substantially L-shaped in plan and provided conveniently with a correspondingly contoured detachable cover 24.

Having its opposite ends projecting from each side of, and journalled in and through the side walls of the housing 23, is the actuating shaft 25. And suitably mounted adjacent the housing 23 on the oppositely projecting ends of the shaft 25, as best seen in Figure 3, are combination flywheel and crank-discs 26, on the outer face of each of which is mounted a pair of registering double or 180 degree throw cranks 27, the intermediate arms of the cranks 27 comprising preferably relatively thin plates or discs 27', whereby the centers of the crank-pins of the respective cranks may be disposed in closely adjacent axial relation.

Pivotally depending from the pairs of cranks 27 on the opposite sides of the machine, are pairs of links 28, 29, the lower ends of each registering pair of links being pivotally mounted on the pins 19 of the respective frames E for suspending and reciprocating the same in the ways 16. The opposite links 28 of one pair are journalled, it may be here stated, by means preferably of ball-bearings 30 on the outer crank-pins of the cranks 27 and are suitably inwardly curved at their lower end for operative connection with the pins 19 on the forward one of the frames E, while the other links 29 are journalled, also preferably by means of ball-bearings 30, on the inner crank-pins of the cranks 27, so that, if desired, the links 29 may be made straight for connection with the pins 19 on the rearward one of the frames E.

It will be seen that, on rotary actuation of the shaft 25, the cranks 27, having 180 degrees difference in throw of their crank-pins, actuate the frames E and their carried knives D simultaneously in opposing directions, thus effecting the neutralization of the cutting action on the loaf-body, as previously mentioned.

I have found that some types of baked loaves are more easily sliced at one speed than another. Hence, in practice, I prefer to provide means for varying the cutting speed of the knives D suitably to the quality of the goods being sliced. For such purpose, I provide a variable speed transmission mechanism, best seen in Figure 3, wherein, I may say, a two-speed ratio of drive is shown, but it will be obvious that as many speeds may be provided as appear desirable for the purposes intended, and, of course, the changes in speed may be made by steps, as shown, or the transmission may be of the continuously variable type, as well understood by those to whom this art appertains.

In the present instance, the shaft 25 has mounted thereon a pair of widely spaced gears 31, 32, of different diameters, cooperable with which is a corresponding pair of closely spaced gears 33, 34, mounted on a common sleeve 35 axially siftably on a jackshaft 36 journalled suitably in the housing 23. As will be understood, only one of the gears 33 or 34 will be in mesh with its mate, as 31 or 32, respectively, the speed-changing shifting actuation of the sleeve 35 on the shaft 36 being effected by a shift-lever 37 mounted suitably exteriorly the housing 23, the shift lever 37 being of conventional construction well known in the art and hence not deemed to require further description, any desired type of such mechanism being suitable for my present purpose.

One of the shiftable gears, as 33, is in constant mesh with an elongated or wide-face pinion 38 mounted on a stub-shaft 39 journalled in and through one wall of the housing 23 for operative connection with a suitable prime-mover, as an electric motor 40, supported for such purpose preferably on the top-plate 22.

And also fixed on the shaft 36, is a gear 56 having meshing engagement with a pinion 57 fixed on the shaft 25 for effecting through the chain 53 actuation, in the present instance, of the conveyer C.

Fixed longitudinally and adjacent the side margins of the conveyer C, is a pair of loaf-retaining walls 41, and disposed longitudinally the feed-plate B, is a pair of loaf-retaining walls 47 mounted for adjustment transversely the feed-plate B for retaining engagement with different size sliced loaves, the walls 42 being suitably attached to the table 5 by a screw or like fastening element 43 disposed for movement in a transverse slot 44 provided for the purpose in a lug 45 projecting laterally from the wall 42, as best seen in Figure 3.

In the operation of the machine, the baked bread-loaves H to be sliced are suitably disposed transversely of and upon the conveyer C preferably in sidewise contiguous or abutting relation, and are by such means successively fed to and through the reciprocating knives D, each pair thereof cutting a slice of bread therebetween and the sliced loaf being compactly retained in presliced form between the cooperating walls 42, from which the sliced loaf may be conveniently removed for wrapping and distribution.

As a precaution against displacement of the slices the machine is preferably equipped with a stripping and hold-down device J provided on the frame A, as best seen in Figure 5, the device J including a plurality of forwardly presented suitably spaced yielding fingers 46 for engaging the loaf both while it is being sliced and after completion of the slicing operation. As shown, the fingers 46 are suitably yieldingly supported at an end in and by a bracket 47 pivotally mounted at an end on a stub 48 secured to the adjacent frame member 1. A detachable fastening element 48' normally secures the bracket 47 in operative position. However, on removing the element 48', said bracket 47 and its carried comb or fingers 46 may be swung forwardly to be disengaged from and clear the knives D. This being accomplished, the frames E may, after removing the bolts 19 therefrom for disconnecting the links 28, 29, from the frames, be dropped readily through the lower open ends of the ways 16 and in such manner quickly removed from the machine. Thus convenient access when and as desired may be had to the knives D.

At the end of a run of the loaves through the machine, the last loaf usually requires manual manipulation for feeding it through the slicing knives. For effecting such feeding manipulation of the last loaf, or any of them, in fact, I provide a ram or pusher bar 49 provided with a plurality of spaced fingers 49' adapted to fit between the knives D as the loaf is advanced therethrough by the bar 49. Said bar 49 is mounted on one end of a plate 50 or like member adapted to shield the knives D from the hands of the operative, the plate 50 being mounted at its other end on a transverse shaft 50' suitably journalled through and between the frame members 1 rearwardly of the knives D, said shaft 50', at one of its projecting ends having a handle 51 adapted for engagement with a suitable catch 52 attached to the adjacent frame members 1 rearwardly of the knives D, 49 in retracted or loaf-clearing elevated position. I might add that I prefer to construct the bar 49 of wood or like material incapable of effecting damage to the sharp cutting edges of the knives D.

It will be seen that, the knife actuating mechanism G of the machine being located on the overhead support F, that is, on a plane elevated from the path of travel of the several bread-loaves through the machine, the actuation and movement of the knives and operating mechanism thereof are not in any way affected or interfered with by falling bread-crumbs or the like necessarily resulting from the slicing operations. On the contrary, the novel construction of the slotted feed plate B provides a ready escape of such crumbs from the sliced-loaf, from whence the crumbs, in clean and palatable condition, fall and may be collected in a suitable bin or the like, enabling a considerable economy in the sale of such bread-crumbs.

It is to be understood that various changes and modifications in the form, construction, arrangement, and combination of the several parts of the machine may be made and substituted for those herein shown and described without departing from the nature and principle of my invention.

Having thus described my invention, what I claim and desire to secure by Letters Patent is,—

1. In a bread-loaf slicing machine, in combination, a main frame, a slotted feed-plate mounted upon the frame, supports upstanding from the main frame, a top-plate mounted on said supports and disposed in elevated spaced relation over the feed-plate, said supports having registering slots extending angularly to the plane of the feed-plate, a pair of knife-carrying frames, shoes on the knife-carrying frames movably disposed in the slots of the supports for reciprocation of the knife-frames in the slot of the feed-plate and under the top-plate, and pins projecting outwardly of the slots from the shoes, means for oppositely reciprocating the knife-frames, said means including mechanism mounted on the top-plate, and links pivotally connecting said mechanism eccentrically with said pins.

2. In a bread-loaf slicing machine, in combination, a main frame, a slotted feed-plate mounted upon the frame, supports upstanding from the main frame, a top-plate mounted on said supports and disposed in elevated spaced relation over the feed-plate, said supports having registering ways extending angularly to the plane of the feed-plate, a pair of knife-carrying frames, shoes on the knife-carrying frames movably disposed in said ways for reciprocation of the knife-frames in the slot of the feed-plate and under the top-plate, and means for oppositely reciprocating the knife-frames, said means including a rotary shaft mounted transversely on the top-plate, mechanism also mounted on the top-plate for driving said shaft, double-throw cranks fixed on said shaft at opposite sides of the machine, and pairs of links pivoted at an end eccentrically upon the cranks and pivotally connected at their other end with said shoes.

3. In a bread-loaf slicing machine, in combination, a main frame, a slotted feed-plate mounted upon the frame, supports upstanding from the main frame, a top-plate mounted on said supports and disposed in elevated spaced relation over the feed-plate, said supports having registering ways extending angularly to the plane of the feed-plate, a pair of knife-carrying frames, shoes on the knife-carrying frames movably disposed in said ways for reciprocation of the knife-frames in the slot of the feed-plate and under the top-plate, and means for oppositely reciprocating the knife-frames, said means including a rotary shaft mounted transversely on the top-plate, mechanism on the top-plate for driving said shaft at variable speeds, double-throw cranks on said shaft at opposite sides of the machine, and pairs of links connecting said cranks eccentrically with said shoes.

NICHOLAS B. CHAVEAS.